(12) United States Patent
Nijim et al.

(10) Patent No.: US 9,607,084 B2
(45) Date of Patent: Mar. 28, 2017

(54) ASSIGNING A SINGLE MASTER IDENTIFIER TO ALL RELATED CONTENT ASSETS

(75) Inventors: Yousef Wasef Nijim, Roswell, GA (US); Terry Douglas Lee, Lawrenceville, GA (US); Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/046,195

(22) Filed: Mar. 11, 2011

(65) Prior Publication Data

US 2012/0233138 A1    Sep. 13, 2012

(51) Int. Cl.
| | |
|---|---|
| G06F 17/30 | (2006.01) |
| H04N 21/235 | (2011.01) |
| H04N 21/278 | (2011.01) |
| H04N 21/84 | (2011.01) |

(52) U.S. Cl.
CPC ..... *G06F 17/3082* (2013.01); *H04N 21/2353* (2013.01); *H04N 21/278* (2013.01); *H04N 21/84* (2013.01)

(58) Field of Classification Search
CPC ......... G06F 17/30864; G06F 17/30017; G06F 17/30752; G06F 17/30899; G06F 17/30598; G06F 17/30026; G06F 17/30047; G06F 17/3064; G06F 17/30781; G06F 17/30846; G06F 17/30109; G06F 17/30412; G06F 17/30784; G06F 17/30858; G06F 17/3082; G06F 17/30817; G06F 17/30038; G06F 17/30796; G06F 17/30312; G06F 17/30749; G06F 17/30743; G06F 17/30867; Y10S 707/913; H04L 65/4084; H04L 67/22; H04N 21/482; H04N 21/8352; H04N 21/252; H04N 21/4722; H04N 21/84; H04N 21/278; H04N 21/2353; H04N 21/4622; H04N 21/4668; H04N 21/4828; H04N 21/47202; H04N 21/4782; H04N 21/466; H04N 21/4826; H04N 21/44222; H04N 21/24
USPC ........................................ 707/701, E17.007
See application file for complete search history.

(56) References Cited

U.S. PATENT DOCUMENTS

| | | | |
|---|---|---|---|
| 6,574,655 B1 * | 6/2003 | Libert et al. .................. | 709/200 |
| 7,372,976 B2 * | 5/2008 | Rhoads et al. ................ | 382/100 |
| 7,434,242 B1 * | 10/2008 | Goode ............................. | 725/9 |
| 7,711,702 B2 * | 5/2010 | Smolen et al. ............... | 707/715 |
| 8,041,074 B2 * | 10/2011 | Rhoads et al. ................ | 382/100 |
| 8,209,729 B2 * | 6/2012 | Phillips et al. ................ | 725/87 |
| 8,271,334 B1 * | 9/2012 | Funk et al. ................ | 705/14.73 |
| 8,316,396 B2 * | 11/2012 | Kulick et al. .................. | 725/48 |

(Continued)

*Primary Examiner* — Evan Aspinwall
(74) *Attorney, Agent, or Firm* — Benjamin A. Balser; Next ip Law Group LLC (57) ABSTRACT

Assigning a single master identifier to all related content assets. Memory is provided for storing content assets and metadata associated with each of the content assets, wherein the metadata includes a plurality of metadata field entries. A processor is coupled to the memory. The processor is configured for analyzing the metadata associated with each of the content assets to produce correlations between metadata field entries associated therewith, identifying related content assets by determining content assets having a predetermined correlation between metadata field entries and assigning a single, unique asset identifier to the related content assets.

19 Claims, 4 Drawing Sheets

(56) References Cited

U.S. PATENT DOCUMENTS

| | | | |
|---|---|---|---|
| 2006/0059168 A1* | 3/2006 | Hamada et al. | 707/100 |
| 2007/0156726 A1* | 7/2007 | Levy | 707/100 |
| 2007/0208715 A1* | 9/2007 | Muehlbauer | 707/3 |
| 2008/0320510 A1* | 12/2008 | Wong | H04N 7/17318 725/24 |
| 2009/0234850 A1* | 9/2009 | Kocsis et al. | 707/6 |
| 2010/0131613 A1* | 5/2010 | Jonsson et al. | 709/218 |
| 2010/0242073 A1* | 9/2010 | Gordon et al. | 725/98 |
| 2010/0274816 A1* | 10/2010 | Guzik | 707/802 |
| 2010/0293579 A1* | 11/2010 | Kulick et al. | 725/49 |
| 2011/0289094 A1* | 11/2011 | Fisher | G06F 17/3002 707/748 |
| 2012/0096499 A1* | 4/2012 | Dasher et al. | 725/87 |
| 2012/0117584 A1* | 5/2012 | Gordon | H04N 21/254 725/19 |

* cited by examiner

ASSIGNING A SINGLE MASTER IDENTIFIER TO ALL RELATED CONTENT ASSETS

FIELD OF THE INVENTION

This disclosure relates in general to the management of content in a distribution network, and more particularly to assigning a single master identifier to all related content assets.

BACKGROUND

Movies and titles may be received from video on-demand (VOD) content providers with different identifiers. When a movie is received, the metadata associated with the content is being recorded. The metadata may include a title, a list of crew involved with the creation of the content, the release year, etc. An identifier is also provided with the particular content.

Currently, service providers assign the same program that is available from different content providers with different Asset IDs when received. For example if the same title from the same provider, who is offering a title in both HD and SD format, is received two Asset IDs are assigned. If there is a change in the parental ratings, the database receives two Asset IDs for the title. Therefore, the database may contain information that causes confusion or is redundant. For example, a user may receive an episode of Friends on VOD HBO. The same episode may also be provided from ABC. The database will identify the program with the same episode information, the same title, etc. The only difference will be the metadata that identifies each copy of the episode will identify two different providers thereby causing the two episodes to be processed separately.

Users may additionally be searching for content that they have purchased. Such content may be obtained from a DVD that the user purchased or a movie that the user purchased online and downloaded. Consumers expect to be able to access content that they own from anywhere. If On Demand assets are offered on other platforms, then each asset will have different Access IDs so there is no unique way to tie these assets together.

Accordingly, it can be seen that there is a need to assign a single master identifier to all related content assets.

SUMMARY OF THE INVENTION

To overcome the limitations described above, and to overcome other limitations that will become apparent upon reading and understanding the present specification, embodiments for assigning a single master identifier to all related content assets are disclosed.

The above-described problems are solved by assigning the same unique Access ID to different versions of the same content. This solution helps with identifying programs to recommend to users, such as sequels to movies with the same title or different formats of the same movie.

In one embodiment, a system for assigning a single master identifier to all related content assets is provided. The system includes memory for storing content assets and metadata associated with each of the content assets, the metadata comprising a plurality of metadata field entries and a processor, coupled to the memory, the processor analyzing the metadata associated with each of the content assets to produce correlations between metadata field entries associated therewith, identifying related content assets by determining content assets having a predetermined correlation between metadata field entries and assigning a single, unique asset identifier to the related content assets.

In another embodiment, a method for identifying related content assets is provided. The method includes receiving content assets at an asset server, storing received content assets in memory, extracting metadata from the received content assets for analysis, analyzing the extracted metadata associated with each of the content assets to produce correlations between metadata field entries associated therewith, identifying related content assets by determining content assets having a predetermined correlation between metadata field entries and assigning a single, unique asset identifier to the related content assets.

In another embodiment, a computer readable medium is provided. The computer readable medium includes executable instructions which, when executed by a processor, identifies related content assets, by receiving content assets at an asset server, storing received content assets in memory, extracting metadata from the received content assets for analysis, analyzing the extracted metadata associated with each of the content assets to produce correlations between metadata field entries associated therewith, identifying related content assets by determining content assets having a predetermined correlation between metadata field entries and assigning a single, unique asset identifier to the related content assets.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to assigning a single master identifier to all related content assets. By assigning the same unique Access ID to different versions of the same content, programs may be identified reliably to recommend to users, such as sequels to movies with the same title or different formats of the same movie.

Figure 1:
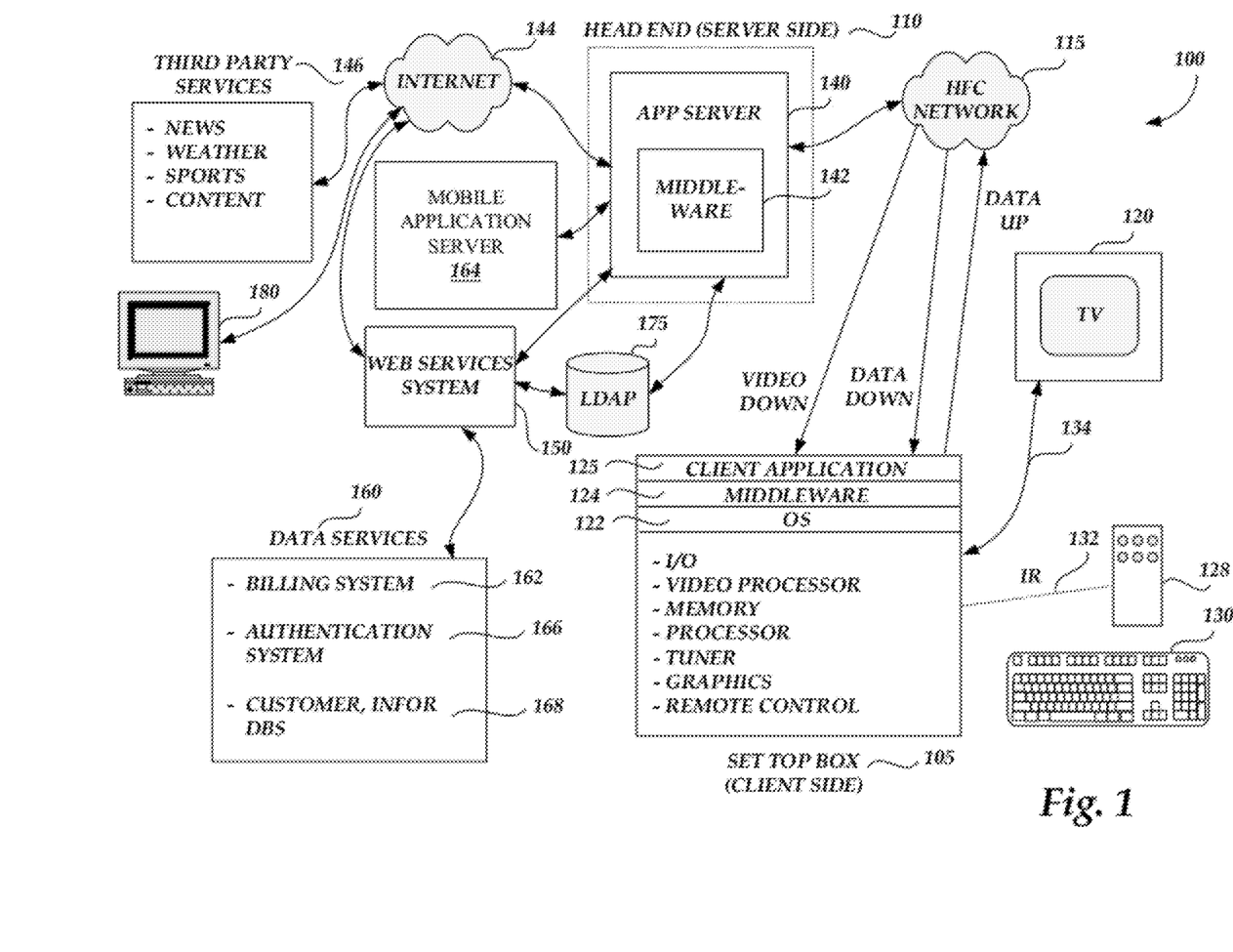
FIG. 1 is a simplified block diagram illustrating a cable television/services system architecture that serves as an exemplary operating environment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments, the functionality of the HFC network 115 allows for efficient bidirectional data flow between the client-side set-top box 105 and the server-side application server 140 of the embodiment.

According to embodiments, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services. According to embodiments, CATV systems 100 assign a single master identifier to all related content assets. Storage 175, which may be a Lightweight Directory Access Protocol (LDAP) server, may be used to store the assets and data associated with the assets. However, those skilled in the art will recognize that embodiments are not meant to be limited to a LDAP server.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items. Those skilled in the art will recognize that a STB 105 is provided for illustration only and that other devices may be implemented instead, such as a DVR, Smart Encoder, Digital TV Converter, Media Center or other computing device.

Because a variety of different operating systems 122 may be utilized by a variety of different brands and types of set-top boxes, a middleware layer 124 is provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment; the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120.

The data downlink and the data uplink, illustrated in FIG. 1, between the HFC network 115 and the set-top box 105 comprise "out of band" data links. According to embodiments, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content. Further, according to embodiments, CATV systems 100 assign a single master identifier to all related content assets.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A cross-platform mobile application server 164 may contain information such as electronic mail addresses, high-speed Internet access subscription information, and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments, the web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
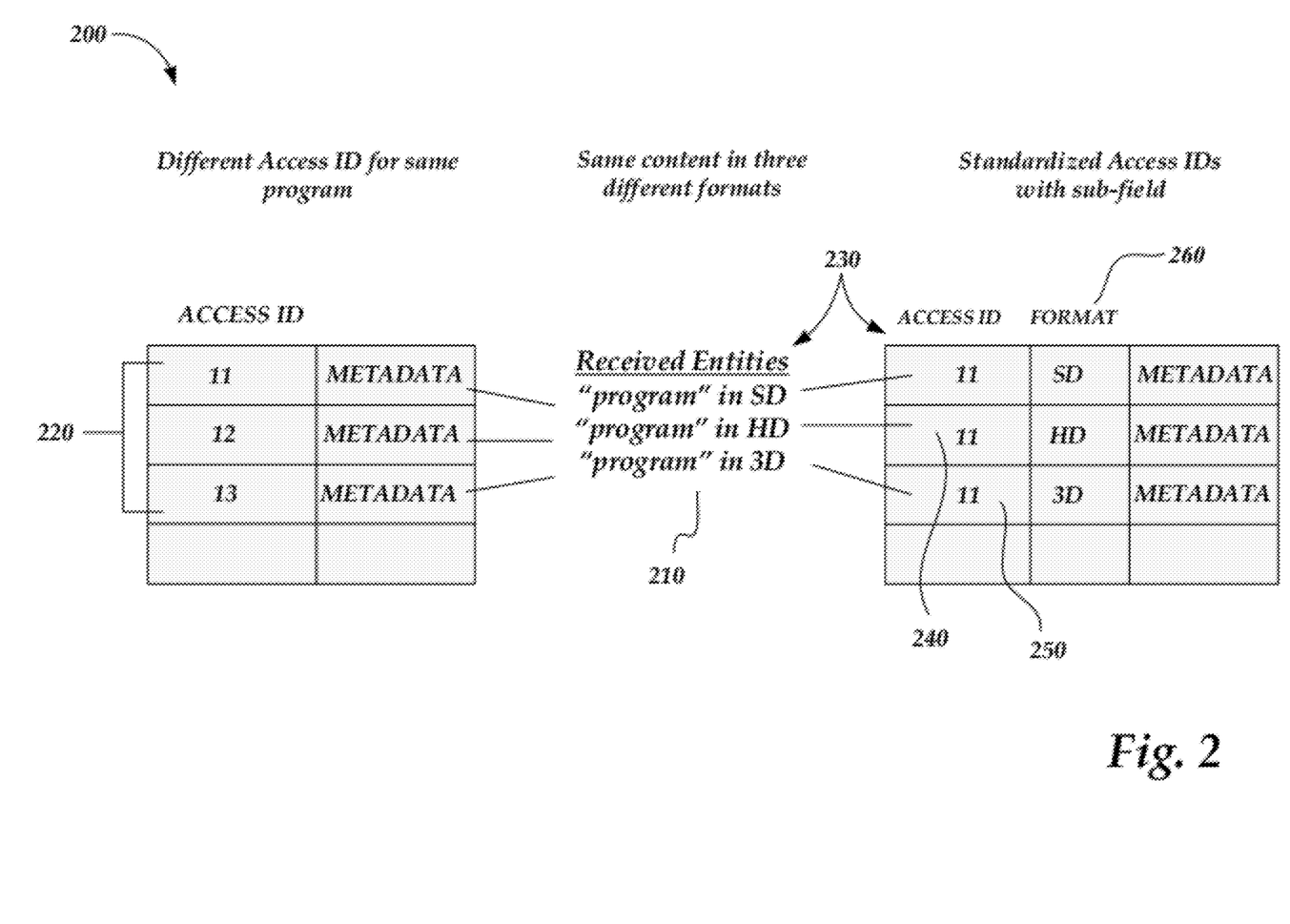
FIG. 2 illustrates multiple content assets having the same master access ID assigned to all related programs according to one embodiment.

FIG. 2 illustrates multiple content assets having the same master access ID assigned to all related programs 200 according to one embodiment. A content provider may have different versions of a particular program or piece of content. The content provider may offer each of the different versions to a network operator for video on-demand service. For example, a SD asset, a HD asset and a 3D asset 210 may be offered to the network operator. Currently, when the network operator accepts all three assets, the three assets are provided to servers which maintain all the fields of the metadata of a piece of content with its own unique identifier on the system 220. Thus, three different IDs 220 are currently used to identify the three assets although they are the same title and program. Because the three IDs are different, there is not a way to automatically correlate the three assets within the system. Thus, a manual operation is required.

A processor may scan the system on a continual basis, detecting any new updates that come into the system. If the SD version was provided first, the master ID creation algorithm (see FIG. 3) would identify the SD version as a new title and a new Access ID would be created and associated with the SD title 230. Next, a HD version is provided to the server. The master ID creation algorithm identifies the first SD version and determines the HD version is merely a different format since everything associated with the SD version appears to be the same as the HD version. Thus, the HD version is associated with the same master ID created for the SD version 240. The same process would be carried out for the 3D version. All of the versions will be associated at the high level metadata perspective, i.e., the master Access ID. The metadata identifying the content as being a different version from the premium channel is just another bit of information that is added to a sub-set of the Access ID.

Accordingly, a common access ID is assigned for all of the related programs 210. Within the master Access ID field, a separate field 260 or sub-field will be provided to identify the particular "Program" and associate the program with its particularity, e.g., it is a sequel, it is in 3D, it is in HD, or it is SD. This could be the Most Significant Byte(s) (MSB) to include this additional information. The master access ID field may consist of the Access ID, ratings, sequel, different formats of the same asset, and producing a newer version of the same asset. This metadata will be provided to mobile devices, PCs, etc. Thus, the "Program" will be identified as the same content 230 but with a different format 260. Content formatted differently for different devices would be identifiable via the metadata and access IDs. If a customer searches for "Program" or if the user wants to recommend "Program", now all of the available programs associated with "Program" will be shown, e.g., "Program in SD", "Program in HD", and "Program in 3D." So when a recommendation engine is used for the customers and a customer watches "Program" formatted for a mobile device, the "Program" will have the same information/metadata as if the customer watched the "Program" on HD, SD, 3D, etc. The metadata will indicate where the "Program" was watched, the title, and that it was formatted for mobile, TV, or other specific devices.

An asset may be accessed four or five different times over a period of a year and each may be from different providers. Using the access ID allows statistical correlation to be performed by a processor (see FIG. 4) thereby enabling the service provider to extract pertinent data associated with the content asset. For example, the service provider may determine how many people access the content, how many times a program was viewed, break down the data into different sub-categories, e.g., how many times the content was viewed in HD, how many times the content was viewed in 3D, etc. In addition, the access ID allows the monitoring of how many times content was viewed regardless of what platform was used to view the content.

Figure 3:
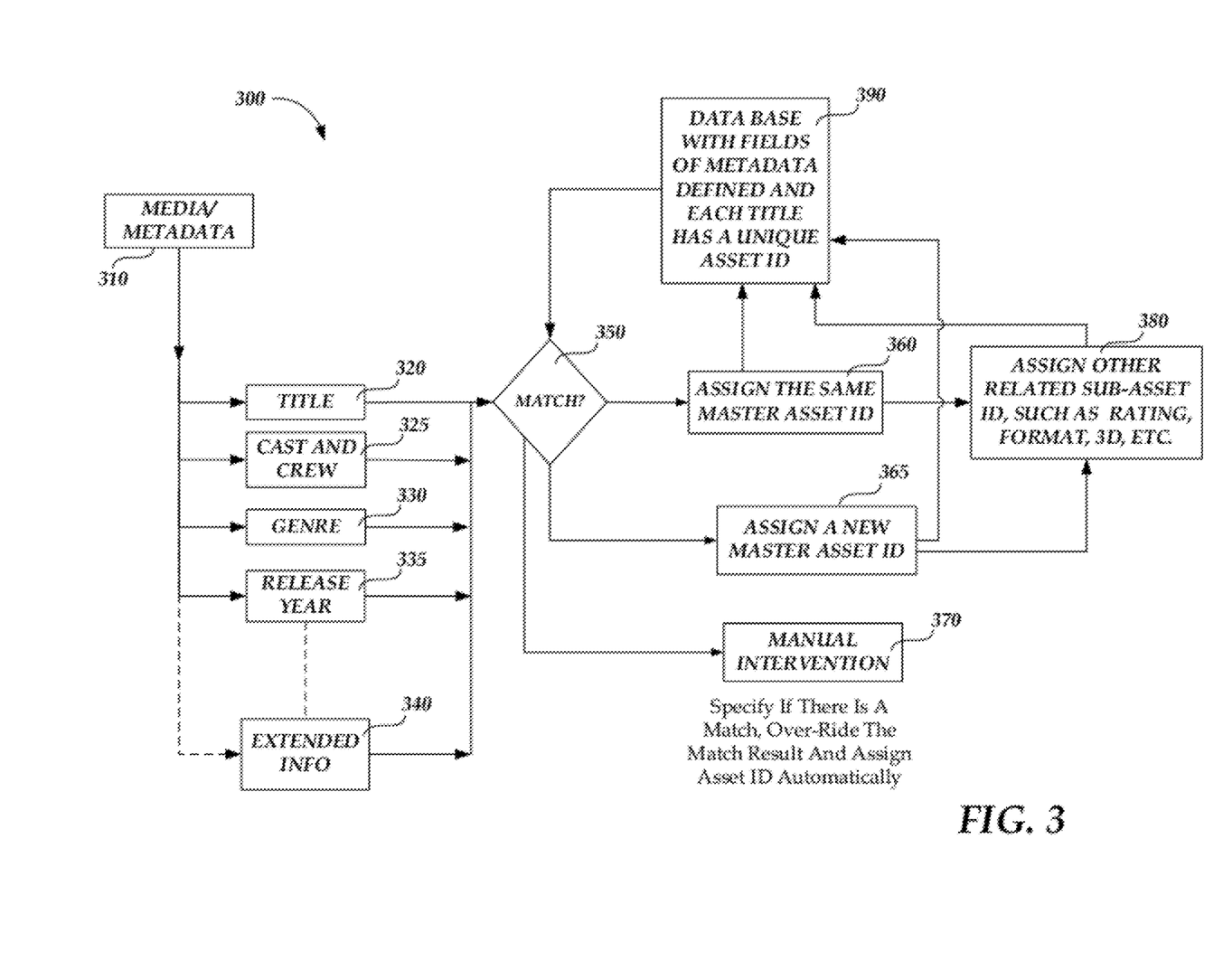
FIG. 3 is a flowchart of the master ID creation algorithm for matching content entries to a database and assigning one unique Access ID for the same asset that is received from different providers according to one embodiment.

FIG. 3 is a flowchart 300 of the master ID creation algorithm for matching content entries to the database and assigning one unique Access ID for the same asset that is received from different providers according to one embodiment. This will standardize the Access ID for all On-Demand programs so it will be easier to locate assets and recommend them to the user. An entity, e.g., a server or database 390, maintains all the fields of the metadata of a piece of content. The entity will attempt to match 350 any program from the content providers to entries in the database. The metadata associated with each of the content assets is analyzed to produce correlations between metadata field entries associated therewith. Related content assets are identified by determining content assets having a predetermined correlation between metadata field entries.

A single, unique asset identifier is assigned to the related content assets. If the same program already exists, i.e., the new asset is determined to have metadata having a predetermined correlation with metadata of existing content assets. In other words, the same Access ID would be used or associated with that particular program. If the program is not within the database and the program represents a new asset, then a new Access ID is assigned for the program. Thus, a series or a sequel will be associated together when shown to the user. Manual intervention might be required if there are errors in the metadata.

The first step is to receive the content assets and metadata from the content provider and extract the crucial information in the metadata 310. These include, but are not limited to: Title 320, Cast and crew 325 (directors, actors, actresses, etc), Genre 330, Release year 335, Movie Provider, and Description of the movie. Additional metadata fields which make the movie unique, such as formats of 3D, HD etc. are also extracted 340.

A continuous scan is performed to detect the receipt of new content assets. When a new content asset is received, a comparison is performed to match 350 the extracted metadata fields 320-240 by searching the Database 390 that includes all the titles that are currently airing or the data that was collected for previously stored content assets. If there is full match as determined by identifying a predetermined correlation in Title 320, Cast and crew 325, Genre 330, Release year 335, and part of Movie Provider; then the same Access ID that exists in the Database is assigned to the new movie 360. If there is no match because a predetermined correlation with metadata field entries of stored content assets was not found, a new Master Access ID is assigned to the movie 365.

If there is a partial match, assign the asset for human interaction to correct errors or to compare manually 370. There may be a partial match because the cast and the crew metadata do not result in a match because there might be an error in the spelling or the way the name has been typed. A manual intervention may be requested because the content is flagged as a partial match and verification by an operator may be performed to determine whether the content is actually a match. The operator will have the new title, the title from the matching algorithm, and the title that is in the database. Given an Access ID, the operator will be able to readily compare this information without requiring an extensive manual search. The flags can be used to identify the information with the new title plus the information that is stored in the database.

Once the Access ID is assigned 360 (match) or 365 (no match), additional information about the asset such as format, sequel, rating, is assigned to the Sub-asset ID. For example, if the rating is different, the new rating is assigned to the MSB of the master access ID to reflect the difference (s). Therefore, the user could see all the sequels associated with the title or all assets with the same title but with different ratings. The user could also see all the formats available to view for the same title.

In the future, the comparison algorithm could apply to match the poster art when available. This is an automated process where the same poster art item would be a match even if the format of the image is different.

Figure 4:
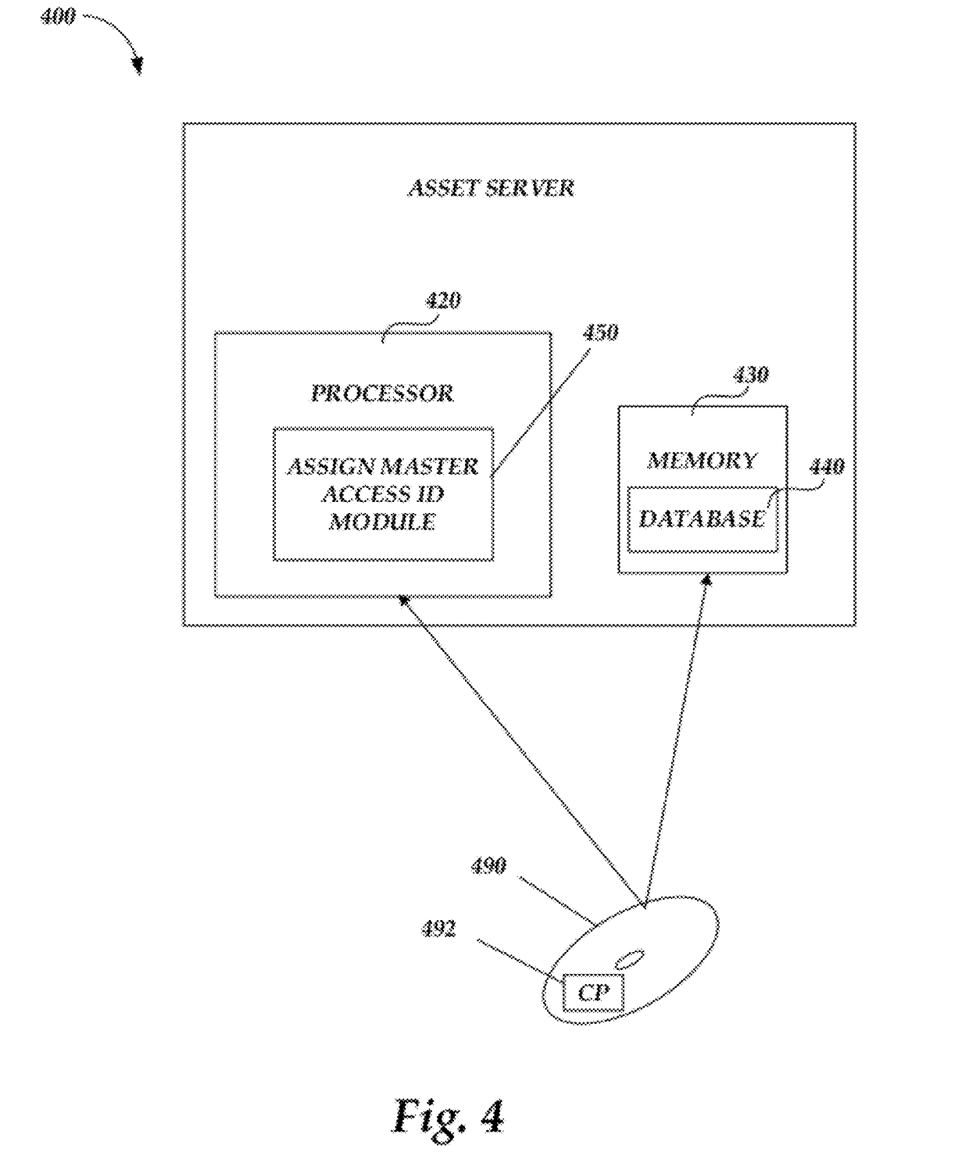
FIG. 4 illustrates a suitable computing environment for implementing a system as described above in FIGS. 1-3 according to an embodiment.

FIG. 4 illustrates a suitable computing environment 400 for implementing a system as described above in FIGS. 1-3 according to an embodiment. In FIG. 4, a content management system 400 for assigning a single master identifier to all related content assets includes a processor 420 and memory 430. Those skilled in the art will recognize that the content management system 400 may be implemented in a head end module, a subscriber receiving device, such as a set-top box, an interactive TV, a portable media device, etc., and other data/content receiving devices. Embodiments may also be implemented in combination with other types of computer systems and program modules. Generally, program modules include routines, programs, components, data structures, and other types of structures that perform particular tasks or implement particular abstract data types. By way of example, computer readable media 490 can include computer storage media or other tangible media. Computer storage media 490 includes volatile and nonvolatile, removable and non-removable media implemented in any method or technology for storage of information 492, such as computer readable instructions, data structures, program modules or other data. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 490 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 490 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 420 may be configured to execute instructions that perform the operations of the embodiments described herein.

It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present embodiments as recited within the claims set forth herein.

Memory 430 thus may store the computer-executable instructions that, when executed by processor 420, cause the processor 420 to implement an Assign Master Access ID Module 450 according to an embodiment as described above with reference to FIGS. 1-3. However, memory 430 may also be configured to provide the database 440 for storing metadata including ratings and other content data, programs, and other content, which is processed by processor 420.

The foregoing description of the embodiments has been presented for the purposes of illustration and description. It is not intended to be exhaustive or to limit the invention to the precise form disclosed. Many modifications and variations are possible in light of the above teaching. It is intended that the scope of the embodiments be limited not with this detailed description, but rather by the claims appended hereto.

What is claimed is:

1. A system for assigning a single master identifier to all related content assets, comprising:
   memory for storing content assets and metadata associated with each of the content assets; and
   a processor, coupled to the memory, the processor:
      analyzing the metadata associated with each of the content assets to produce correlations between metadata associated therewith;
      identifying related content assets by determining content assets having a predetermined correlation between metadata;
      assigning a single, unique asset identifier to each of the related content assets; and
      using the unique asset identifier to:
         extract information; and
         identify related content assets by determining content assets with a predetermined statistical correlation.

2. The system of claim 1, wherein the processor continuously scans the memory to detect a new content asset added to the memory for processing to assign an asset identifier to the new content asset.

3. The system of claim 2, wherein the processor analyzes the metadata associated with the detected new content asset when the processor detects a new content asset has been added to the memory and determines whether metadata of the detected new content asset has a predetermined correlation with metadata of the content assets stored in memory.

4. The system of claim 3, wherein the processor assigns an asset identifier associated with a previously stored content asset when the processor determines the metadata of the new content asset has a predetermined correlation with metadata of the previously stored content asset.

5. The system of claim 3, wherein the processor assigns a new unique asset identifier to the new content asset when the processor determines the metadata of the new content asset does not have a predetermined correlation with metadata of content assets stored in the memory.

6. The system of claim 1, wherein the related content assets comprise different format versions of content.

7. The system of claim 6, wherein an identification of a format version is provided in the metadata of content assets.

8. The system of claim 1, wherein the processor determines statistical access information related to each of the content assets.

9. The system of claim 8, wherein the processor uses the determined statistical access information to determine a time each of the content assets was viewed, who accessed the content asset and a type of device used to access the content asset.

10. The system of claim 1, wherein the processor provides for manual intervention when errors are detected in the metadata.

11. A method for identifying related content assets, comprising:
   receiving content assets at an asset server;
   storing received content assets in memory;
   analyzing metadata associated with each of the content assets to produce correlations between metadata associated therewith;
   identifying related content assets by determining content assets having a predetermined correlation between metadata;
   assigning a single, unique asset identifier to each of the related content assets; and
   using the unique asset identifier to:
      extract information; and
      identify related content assets by determining content assets with a predetermined statistical correlation.

12. The method of claim 11 further comprising continuously scanning the memory to detect receipt of a new content asset for processing to assign an asset identifier to the new content asset.

13. The method of claim 12 further comprising analyzing the poster art associated with the detected new content asset and determining whether metadata of the detected new content asset have a predetermined correlation with metadata of content assets stored in memory.

14. The method of claim 13 further comprising assigning an asset identifier associated with a previously stored content asset when the metadata of the new content asset has a predetermined correlation with metadata of the previously stored content asset.

15. The method of claim 13, further comprising assigning a new unique asset identifier to the new content asset when the metadata of the new content asset does not have a predetermined correlation with metadata of content assets stored in the memory.

16. The method of claim 11 further comprising determining statistical access information related to each of the content assets.

17. The method of claim 16, wherein the determining statistical access information further comprises determining a time each of the content assets was viewed, who accessed the content asset and a type of device used to access the content asset.

18. The method of claim 11 further comprising initiating manual intervention when errors are detected in the metadata.

19. A non-transitory computer readable medium including executable instructions which, when executed by a processor, identifies related content assets, by:
- receiving content assets at an asset server;
- storing received content assets in memory;
- analyzing metadata associated with each of the content assets to produce correlations between metadata associated therewith;
- identifying related content assets by determining content assets having a predetermined correlation between metadata;
- assigning a single, unique asset identifier to each of the related content assets; and
- using the unique asset identifier to:
  - extract information; and
  - identify related content assets by determining content assets with a predetermined statistical correlation.

* * * * *